Sept. 22, 1964     J. A. KEIR     3,149,501
AIR CONDITIONED STEERING WHEEL
Filed Jan. 18, 1962
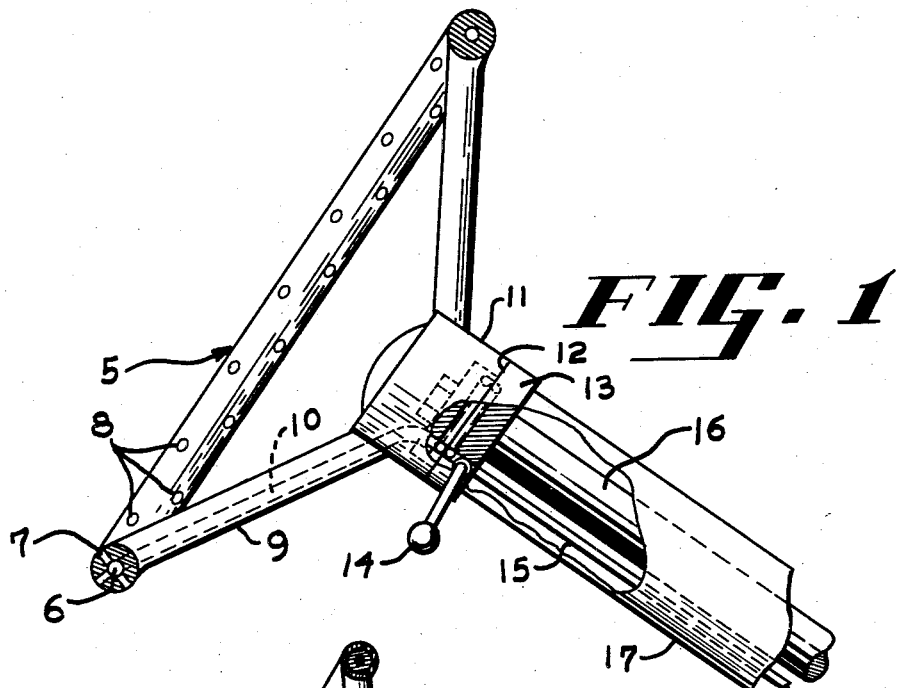
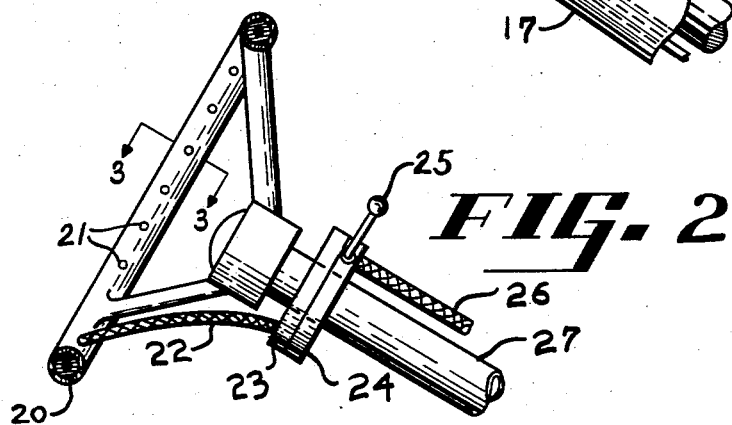
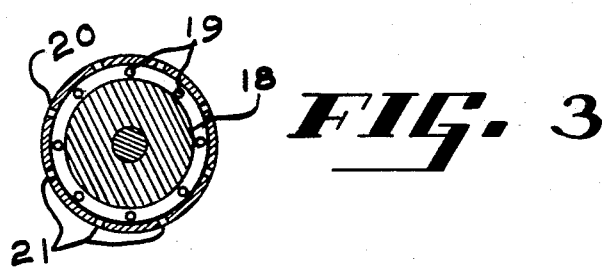
INVENTOR
JOHN A. KEIR 3,149,501
AIR CONDITIONED STEERING WHEEL
John A. Keir, 7940 Lake Park Court, Jacksonville, Fla.
Filed Jan. 18, 1962, Ser. No. 167,081
3 Claims. (Cl. 74—552)

This invention relates to automobiles, and more particularly to the steering wheel of an automobile.

Many people who drive automobiles sweat profusely, particularly in the hands. This hand sweating becomes very irksome when driving a car and has even been suspected in some cases to be a contributing factor to certain automobile accidents including some fatal ones in which passengers as well as drivers have been killed or seriously injured.

It is therefore an object of this invention to provide an air conditioned steering wheel for automobiles that cools one's hands and thereby permits one to have a better grip on the steering wheel at all times.

Another object of this invention is to provide an air conditioned steering wheel for automobiles and the like that is independently controlled by mechanism not connected to any other air conditioner that may be installed in the automobile.

Another object of this invention is to provide an air conditioned steering wheel that can readily be adapted to an automobile by merely replacing the conventional steering wheel with the same.

Another object of this invention is to provide an air conditioned steering wheel adaptable to the steering column of any means of motion that normally has a steering wheel.

Another object of this invention is to provide an air conditioned steering wheel for automobiles that will receive its cooling air from any desired source of air supply.

Another object of this invention is to provide an air conditioned steering wheel for automobiles that can also be used to provide hot air to the hands in cold weather.

Another object of this invention is to provide an air conditioned steering wheel that can readily be adapted to any make, model and year of automobile.

Another object of this invention is to provide an air conditioned steering wheel for automobiles and the like that is fool proof in so far as the air conditioning is concerned.

Another object of this invention is to provide an air conditioned steering wheel for automobiles that can be manufactured and retailed at a price well within the reach of every vehicle owner.

Still another object of this invention is to provide an air conditioned steering wheel for automobiles with a finger tip control for the same.

Other and further objects and advantages of this invention will be hereinafter described, and the novel features thereof defined in the appended claims.

Referring to the drawing:

FIGURE 1 is a side view of this invention.

FIGURE 2 is a side view of an alternate form of construction of this invention.

FIGURE 3 is a sectional view taken substantially along line 3—3 of FIGURE 2 as viewed in the direction indicated by the arrows.

Similar reference characters refer to similar parts throughout the several views of the drawing.

Having reference now to the drawing in detail, there is generally indicated by the character 5 a steering wheel of an automobile or the like that has a centrally located passage 6 from which radially extends a plurality of equally spaced passages 7 that terminate in openings 8 in the circumference of the said steering wheel 5. One of the spokes 9 of the steering wheel is also provided with a passage 10 throughout its entire length. The upper end of this last mentioned passage leads directly into the forsaid centrally located passage 6 while the lower end of the same pasage 10 terminates in a rotary manifold 11 that is also the hub of the said steering wheel whose bottom surface 12 is in rotable and sealing contact with the top surface of the air distributor 13 that is provided with a manually operated "finger-tip" control valve having a handle 14. An air supply line 15 runs along the side of the steering column 16 to the said air distributor 13 from any desired source of air. Both the said air supply line 15 and the steering column 16 are encased in a tubular housing 17 as is clearly shown in FIGURE 1 of the appended drawing.

An alternate form of construction of this invention provides the exact same benefits as the above described embodiment by having the steering wheel 18 supporting a plurality of radially spaced rods 19 which are encompassed by a rigid plastic cover 20 having a plurality of equally spaced openings 21 in the circumference thereof to provide cool (or warm) air to one's hands. A flexible air hose 22 connects the said steering wheel with the rotary manifold 23 that is adapted to reecive air from the air distributor 24 that is provided with a manually operated "finger-tip" control valve having a handle 25. An air supply line 26 connects the said control valve which is of course mounted in an encompassing manner on the upper end of the steering column 27 with any desired source of air.

It is obvious from examination of the appended drawing and a reading of this specification exactly how this novel air conditioned steering wheel functions in order to meet the objects of the invention: for one cannot help but understand that when the air supply line 15 FIGURE 1, is connected to a source of fresh air and the handle 14 of the air distributor 13 is opened that air will flow on into the steering wheel 5 through the previously described passages 9, 7 and 6 and on out the plurality of openings 8 in the said steering wheel, thus providing better hand comfort to the operator of the automobile.

The method by which this invention functions when the alternate form of construction is used is so clear from the previously stated description of its construction and by examination of FIGURES 2 and 3 of the drawing that nothing more need be said concerning the same.

From the foregoing it will now be seen that there is herein provided an air conditioned steering wheel which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative, and not in a limiting sense.

What I therefore claim as my invention and desire to secure by Letters Patent is:

1. An air conditioned steering wheel for any vehicle requiring the same, the said air conditioned steering wheel being of the character described and comprising a steering wheel supporting a plurality of radially spaced rods which are encompassed by a rigid covering having a plurality of equally spaced openings therein, and a flexible air hose having its upper end so connected to the said steering wheel that any air under pressure in the said hose will be forced out the openings in the rigid covering thereby cooling the hands of whomever may be holding the said steering wheel, and the lower end of the said flexible air hose being connected to an air distributor adapted to mechanism controlling the flow of air from an air supply line along side the steering column supporting the said steering wheel the lower end of the said air supply line being connected to any suitable source of air under pressure.

2. An air conditioned steering wheel for any vehicle requiring the same, the said air conditioned steering wheel being of the character described and comprising a steering wheel supporting a plurality of radially spaced rods which are encompassed by a rigid covering having a plurality of equally spaced openings therein, and a flexible air hose having its upper end so connected to the said steering wheel that any air under pressure in the said hose will be forced out the openings in the rigid covering thereby cooling the hands of whomever may be holding the said steering wheel, and the lower end of the said flexible air hose being connected to an air distributor adapted to a manually controlled valve controlling the flow of air from an air supply line along side the steering column supporting the said steering wheel the lower end of the said air supply line being connected to any suitable source of air under pressure.

3. An air conditioned steering wheel for any vehicle requiring the same, the said air conditioned steering wheel, being of the character described and comprising a steering wheel supporting a plurality of radially and equally spaced rods which are encompassed by a rigid covering, having a plurality of equally and radially spaced openings therein and a flexible air hose, having its upper end so connected to the said steering wheel that any cool air under pressure in the said flexible hose will enter the space between the said rigid covering and the said steering wheel and then on out the plurality of openings in the said rigid covering and cool the hands of whoever may be holding the said steering wheel, and the lower end of the said flexible hose being connected to a rotary manifold of the same diameter as the air distributor on top of which it is located, both the said rotary manifold and the said air distributor having a centrally located opening therein through which passes the steering column supporting the said steering wheel, and an air current supply line parallel to the said steering column, the upper end of the said air current supply line being connected to the said air distributor, and the lower end being connected to any suitable source of cool air.

References Cited in the file of this patent
UNITED STATES PATENTS

| | | |
|---|---|---|
| 586,371 | Stein | July 13, 1897 |
| 1,237,231 | Wilson | Aug. 14, 1917 |
| 1,358,451 | Kay | Nov. 9, 1920 |
| 1,416,946 | Cobus | May 23, 1922 |
| 1,747,190 | Sheirs | Feb. 18, 1930 |
| 1,822,338 | Clemens | Sept. 8, 1931 |
| 2,251,370 | Motzer | Aug. 5, 1941 |